United States Patent [19]
Boomstra

[11] 3,877,159
[45] Apr. 15, 1975

[54] ROTARY DISK CUTTER FOR A CUTTER DREDGE

[76] Inventor: Gijsbertus Jan Willem Boomstra, 12 Mijendelseweg, Wassenaar, Netherlands

[22] Filed: June 20, 1973

[21] Appl. No.: 371,926

[30] Foreign Application Priority Data
June 30, 1972   Netherlands ................... 7209255

[52] U.S. Cl. ................... 37/64; 37/189; 172/604
[51] Int. Cl. .................................... E02f 3/92
[58] Field of Search .................. 37/64–67, 189, 37/91–93; 172/604

[56] References Cited
UNITED STATES PATENTS
| 126,655 | 5/1872 | Tuttle | 172/604 |
| 1,274,927 | 8/1918 | Moon | 37/189 |
| 1,705,428 | 3/1929 | Twiford | 37/66 |
| 1,769,999 | 7/1930 | Johnson | 37/64 |
| 2,542,474 | 2/1951 | Burchett | 37/92 |

Primary Examiner—Clifford D. Crowder
Attorney, Agent, or Firm—Ladas, Parry, Von Gehr, Goldsmith & Deschamps

[57] ABSTRACT

A disk cutter to be mounted for rotation on a closely adjoining pivotal suction tube end for use in a cutter dredge for a more efficient suction from the disk surface with a relatively small quantity of water.

5 Claims, 2 Drawing Figures

ROTARY DISK CUTTER FOR A CUTTER DREDGE

BACKGROUND OF THE INVENTION

This invention relates to a rotary disk cutter for a cutter dredge.

When dredging a track, a cutter dredge is advanced stepwise by means of a pair of spuds which are arranged abaft the vessel, and yaws about a spud which is placed on the ground, across the channel to be dredged, after each step, said cutter which is supported in front of the vessel, cutting loose a strip of underwater ground which is conveyed upwards, with a quantity of water, through a suction tube having its intake end above the cutter.

In the usual embodiment the cutter comprises a ring of knives which give the cutter the appearance of a crown or basket. When the vessel is traversed, the cutter is rotated on an actuated shaft, with the knives cutting loose in a beating motion chips or shavings of ground. The problem with the discontinuous action of the knives is, however, that thereby vibrations are generated, causing undue wear of components, and because of the beating action the knives also get blunt soon, with as a further problem that cut-off chips, once they are dropped back on the bottom, get difficulty through the openings between the rotating knives in the suction tube which has its intake end immediately above the cutter.

The required power for such a discontinuous action of the cutter is furthermore considerable.

A further difficulty of the usual embodiment is that the suction tube is not directly sucking off the cutting surface of the knives but has its suction mouth spaced at a substantial distance therefrom, with thus far also little guidance being provided in the transport of the material to the suction mouth as a result of the openings between the knives.

Said difficulties taken together result in an operation at high cost, whereas the ground removal is not at an optimum, with a great proportion of water being sucked in through the large openings between the knives.

SUMMARY OF THE INVENTION

The present invention has as its object to overcome all said difficulties by means of a cutter allowing an optimum operation, and is thereto characterized in that the cutter is not formed as a crown but as a circular scoop or concave disk, with its disk surface being rotatable and the disk margin forming a rotary cutting edge, and the disk surface closely adjoining to a widened suction tube end and being mounted in said suction tube end on a rotary shaft which is obliquely directed onto the suction tube axis in accordance with the desired cutting angle with respect to the ground, said suction tube end being adapted to pivot about the suction tube axis in order to turn the position of the cutter at the termination of a traversing stoke.

The advantages thus to be gained are many: No shavings or chips of ground are cut, but a ribbon or elongated strip is peeled, which is sucked directly off the cutting surface and along the adjoining enlarged surface of the suction tube end, with a low proportion of water, through the suction tube which is joined to the cutting disk. Said aspect is particularly due to the fact that for sucking-in the cut-off ground ribbon only a small suction mouth is required. Accordingly, the widened suction tube end is re-entrantly curved, above the disk surface, to an end surface which is closed as much as possible, and has resemblance to an ear opening, with the rotary shaft, on which the cutter is mounted, extending obliquely with respect to the suction tube axis across the ear opening-like suction mouth, by which configuration of the end surface the inflow losses are limited.

Also the beating or discontinuous cutting action of the thus far usual cutter having rotating scythes or knives is now replaced by the continuous cutting action of the disk edge, so that no longer vibrations are generated and the required power for the cutting operation is substantially less. The problem of the cutting edge getting blunt is also no longer a problem, because, as is known, a rotating meat knife, to which the new ground cutting disk is comparable, in fact does not have to be sharp at all in view of its fast rotation.

In practice various configurations may be adapted for the cutting edge, with moreover a saw toothed cutting edge also being a possibility, although a continuous cutting edge, in view of some of the advantages mentioned in the foregoing, is to be preferred.

A further practical aspect is that at the joint of the widened suction tube end and the disk surface of the cutter absolutely no tight seal is required but on the contrary a wide clearance may be left, so that the water may freely pass here and no ground may get stuck between the rotating cutter and the suction tube end, which would result in friction and wear.

The invention is described in more detail in the following specification with reference to the drawings, in which examples of the invention are shown.

DESCRIPTION OF THE PREFERRED EMBODIMENTS

Figure 1:
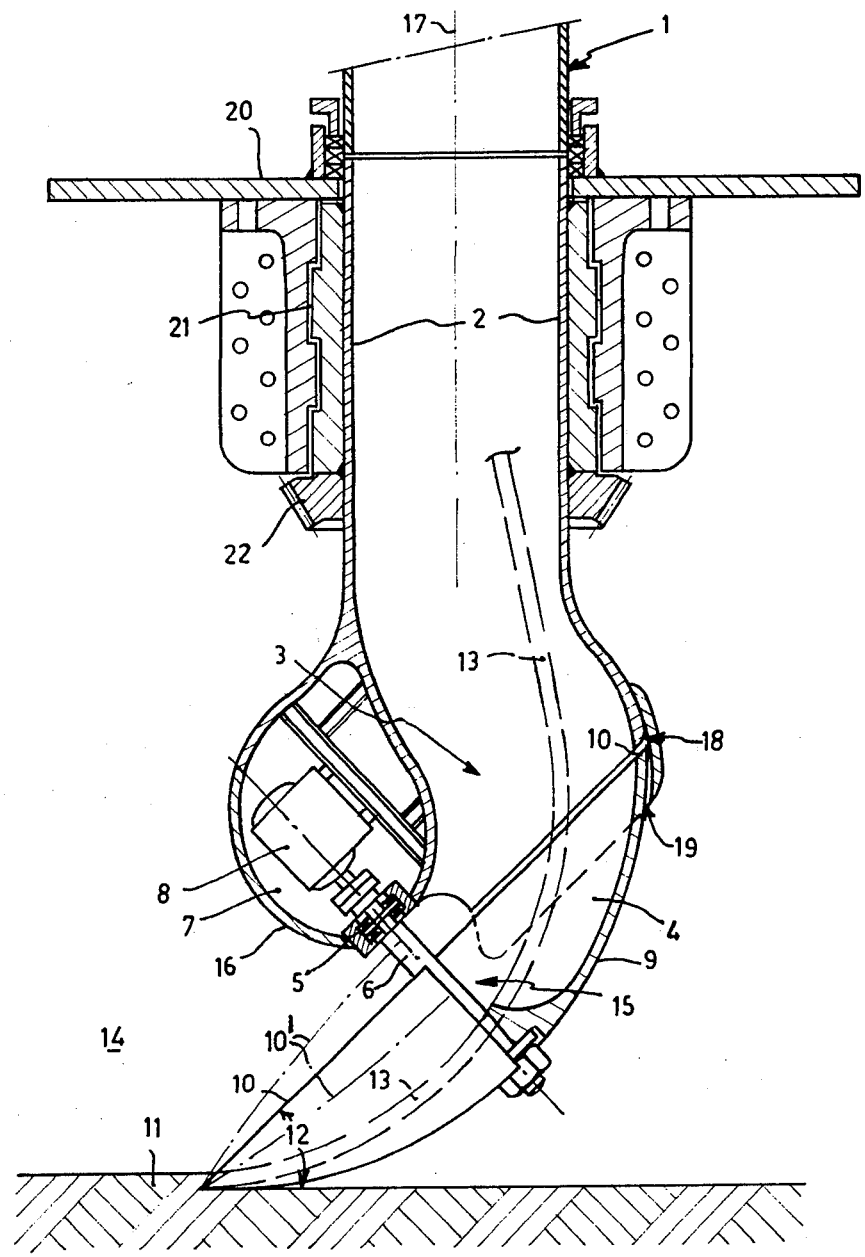
FIG. 1 shows a rotary cutter on a suction tube end which is turnable with respect to the suction tube, which construction is shown in elevation to the left of the rotational axis of the cutter, and in section through its center to the right of said axis, it being noticed that in the left hand view is also illustrated in phantom the case that the cutter is somewhat turned about the suction tube axis for an improved cutting action.

As shown in FIG. 1, the suction tube 1 of a cutter dredge has a pivotal end 2 having a widened mouth 3, in which a cutter 4 is mounted on a shaft 6 which is journaled in a bearing 5, said shaft being adapted to be rotated by a motor 8 which is arranged in an enclosed and sealed space 7 provided thereto. The cutter 4 is formed as a circular scoop or concave disk, comprising the spherical disk surface 9 and the disk edge 10, the latter forming the rotatable cutting edge which, at a cutting angle 12 to be adjusted in dependency of the type of ground to be dredged, cuts off a ribbon or long peel 13 of the ground. Said ground ribbon 13 is sucked off directly along the bottom of the disk surface 9 to the suction tube 1 and in order to let said sucking-off action take place in a continuously flowing motion the suction tube end is provided with a spherical widened mouth 3 which is adjoining and flush with the disk surface 9.

The manner in which the new cutter 4 peels the ground 11 has resemblance to the manner, of operation of the rotating knife of a meat cutting machine, in which the material to be cut is severed without any impact. Besides the fact that thus no cut-off chips or shavings are formed, which may drop back again on the ground 11, in this non-intermittent but continuous cutting manner also no undue vibrations are created, which may lead to early wear of components exposed thereto.

The ribbon 13 which is peeled from the ground 11 by the cutting edge 10, is sucked, with a proportionally low quantity of water 14, through the suction orifice 15 in the suction tube end 2 and conveyed upwards through the suction tube 1. In order to keep the proportion of water as low as possible, the widened mouth 3 of the suction tube end 2 is re-entrantly curved above the disk surface 9 to form an end surface 16 which is closed as much as possible, with a rather small suction orifice 15. The cut-off ground 13 is not sucked-in as thus far in a disorderly non-orientated array, but enters the suction orifice 15 longitudinally, whereby the entrainment of the water 14 may also be kept very low. Due to the selected configuration of the suction mouth the inflow losses are substantially reduced.

The suction orifice 15 and the closed end surface 16 considered together have some resemblance to an ear opening or even more perhaps to a horn shell opening, whereby the closed end surface 16 may be utilized to accomodate the enclosed space 7, in which the motor 8 for the actuation of the shaft 6 of the cutter 4 is arranged. The cutter 4 is at an angle to the ground 11, said angle being determined by the type of ground and the desired magnitude of the cutting angle 12, at which the cutting edge 10 should cut in the ground 11, and accordingly the shaft 6 of the cutter 4, which shaft extends in the suction orifice 15, is at an angle to the suction tube axis 17, whereby it appears in practice advantageous to arrange the shaft 6 and accordingly also the cutter 4 within the reach of the extension of the suction tube axis 17 and not too far outside it. For besides an improved suction action this may also augment the strength of the structure.

In FIG. 1 is seen that for an improved sucking-in action the widened suction tube end 2 is adjoining and flush with the disk surface 9 of the cutter 4 at the level of the rotatable cutting edge 10, but at this joint 18 absolutely no tight seal is required and on the contrary a wide clearance 19 may be allowed, through which the water 14 may pass freely, so that no ground may get stuck between the rotating cutter 4 and the suction tube mouth 3, which would lead to high friction during the rotation and would cause much wear.

Various desired configurations may be adapted for the knife edge 10, and also the use of a saw toothed cutting edge is to be considered, but in general a continuous cutting edge will be preferred, as thereby a beating or knocking motion which would create vibrations, is avoided.

In fact the edge 10 does not have to be razor-sharp, as said edge not only easily penetrates into the ground 11 because of its sharpness but also due to its fast rotation.

Moreover also a finely toothed cutting edge may be used, which due to its high cutting frequency provides a more continuous or semi-continuous cutting action compared to the beating low-frequent action of the rotating knives of the thus far usual cutters.

As shown in FIG. 1, the suction tube end 2 is adapted to be turned about the suction tube axis 17, and on the ladder end 20 between the suction tube end 2 and the suction tube 1 is provided a journal 21 to that end, so that the suction tube end 2 and the cutter 4 can be turned over substantially 180° about the suction tube axis 17 at the termination of a working stroke of the cutter dredge to starboard or port before the returning yaw motion, which turning operation is effected by means of a welded-on toothed ring 22.

For a more scooping action the cutter is usually also positioned somewhat turned about the suction tube axis, as is indicated in the left hand view in FIG. 1 at 10'.

At a fixed inclined position of the rotational axis of the cutter with respect to the suction tube axis the cutting angle may further be varied by selecting different radii of curvature for the disk surface, and also interchangeable toothed or non-toothed cutting edges of a geometry which is adapted to the operational circumstances may be used.

Figure 2:
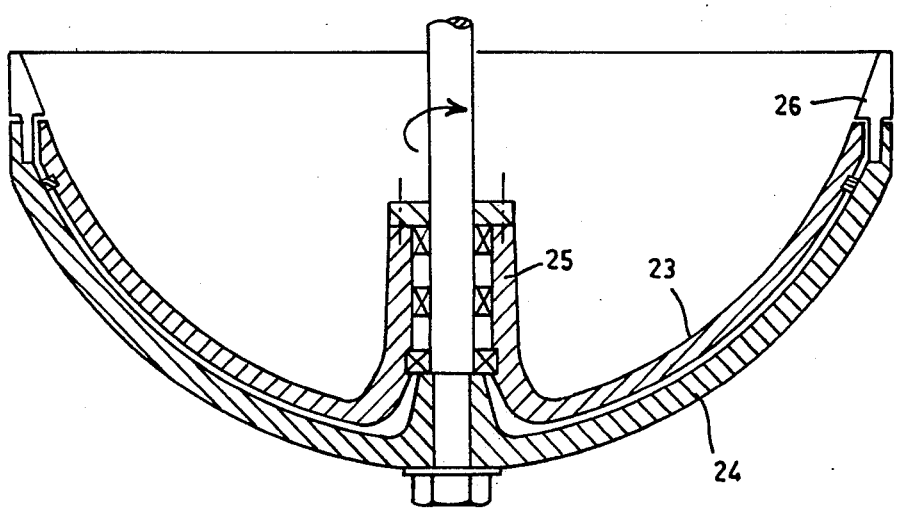
FIG. 2 shows another embodiment of the cutter.

A further embodiment of the new cutter is illustrated in FIG. 2. Herein the cutting disk consists of an inner disk 23 and an outer disk 24. The inner disk 23 forms a hub bearing 25 for the outer disk 24, with the latter being actuated, whereby the inner disk 23 is also adapted to be rotated by the influent mixture of sand and water. With this embodiment can be attained that with very coherent ground the cutting speed of the knife edge may substantially be increased without substantially increasing the required power for the rotation, and the fricture of the sand mixture along the disk and the resulting wear thereof. The outer disk 24 is here provided with a replaceable cutter edge 26 which may be positioned at the desired cutting angle with respect to the ground.

It is observed that the embodiments described in the foregoing are only illustrative by way of example and should not be interpreted in a limiting sense, as an expert in the art may readily adopt certain variations or modifications within the scope of the present invention. So the adjustment of the cutting angle will preferably be effected by a variation of the angle between the suction tube axis and the cutter shaft, and in the widened suction tube end an adjustable adapter is then provided to that end, forming the connection between the suction tube and the cutter, which may be in the form of a replaceable wear lining.

What is claimed is:

1. In a cutter dredge, the combination of a ladder, a suction tube supported by said ladder and having an end portion which is turnable about its own axis, a dished disk cutter mounted for rotation at the free end of the end portion of said suction tube with the disk surface in an inclined position with respect to the axis of said end portion and with the concave side of the disk cutter facing said free end, and motor means housed in said end portion and connected to rotate said disk cutter about its axis, the shape of said end portion being such that, proceeding in the direction towards it free end from its other end, it is first widened so that it is closely adjacent to the high side of the inclined disk surface and then re-entrantly curved above the low side of the inclined surface to form a restricted suction mouth.

2. In a cutter dredge, the combination as claimed in claim 1 and further comprising a rotatable disk mounted inwardly of the disk cutter and forming a hub bearing for the disk cutter.

3. In a cutter dredge, the combination as claimed in claim 1 and wherein the disk cutter has a cutting edge which is detachable from the rest of the disk cutter for replacement by another cutting edge.

4. In a cutter dredge, the combination as claimed in claim 1 and wherein the disk cutter has a smooth cutting edge.

5. In a cutter dredge, the combination as claimed in claim 1 and wherein the disk cutter has a toothed cutting edge.

\* \* \* \* \*